3,041,356
PREPARATION OF EPOXY ALCOHOLS FROM
EPOXY ALKANALS
George B. Payne, Berkeley, and William J. Sullivan, Oakland, Calif., assignors to Shell Oil Company, a corporation of Delaware
No Drawing. Filed Sept. 2, 1958, Ser. No. 758,578
5 Claims. (Cl. 260—348)

This invention relates to the preparation of epoxy alcohols and, more particularly, to a new and useful process for the production of epoxy alcohols from epoxyaldehydes.

The epoxy alcohols, or glycidols as they are generally known, are useful for a wide variety of purposes. Because they include two types of functional groups, the vic-epoxy or oxirane configuration

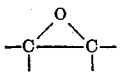

and the hydroxyl group, they are useful intermediates for the preparation of resinous materials, pharmaceuticals, plasticizers, dyes, surfactants and similar organic substances. They are also useful as extractants in numerous vegetable, animal and mineral oil extraction processes.

In the past, glycidols have been prepared by the reaction between epoxy halides, such as the epihalohydrins and such alkaline reagents as alkali hydroxides, metal alcoholates, concentrated aqueous alkalies or carbonates, or organic bases. Under these alkaline conditions, however, the epoxy ring is also attacked so that the yield of the glycidol is reduced and appreciable amounts of glycerols are obtained. See in this regard, Rider and Hill, JACS 52, 1521–27 (1930).

Another mode of preparation of the glycidols has been to dehydrohalogenate a halogenated polyhydric alcohol under basic conditions, simultaneously closing the epoxy ring and removing the halogen to yield the epoxy alcohol. Such a process is described in the patent to Groll et al., U.S. 2,224,849, issued December 17, 1940, and the patent to Marple et al., U.S. 2,248,635, issued July 8, 1941.

It is an object of the present invention to provide a method for the preparation of epoxy alcohols from epoxyaldehydes. A further object of the invention is the provision of a method for preparing epoxy alcohols under conditions such that the epoxy ring of the starting aldehyde is preserved intact in the product alcohol. Still a further object of the invention is a method for preparing such epoxy alcohols in aqueous or non-aqueous solution and under comparatively mild conditions of basicity and temperature so that the reaction may be conducted readily in existing equipment. Other objects will be apparent from the following description of our process.

We have discovered that these and other objects may be accomplished in the present invention by reacting an aliphatic epoxyaldehyde with a soluble metal hydride selected from the group consisting of metal aluminum hydrides and metal borohydrides, in a solvent with which the hydride does not react, to produce the epoxy alcohol. Inasmuch as we conduct the reaction under conditions of comparative mildness, only the carbonyl group of the epoxyaldehyde reacts and the epoxy ring is preserved intact. This is rather surprising in view of the well-known tendency of metal hydrides to open epoxy rings and produce alcohols; see, for example, Micovic and Mihailovic, Lithium Aluminum Hydride in Organic Chemistry, pages 68–74 (Izdavacko Preduzece, Belgrade, 1955).

The epoxyaldehyde reactant includes aliphatic compounds characterized by the possession of both the formyl group —CHO and the vic-epoxy or oxirane group

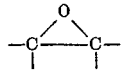

These compounds may readily be prepared by the epoxidation of unsaturated aldehydes. Representative epoxyaldehydes include those epoxy compounds produced by the oxidation of alpha,beta-unsaturated aldehydes such as acrolein, crotonaldehyde, methacrolein, tiglic aldehyde, citral, and the like, and a representative epoxyaldehyde is glycidaldehyde, which is prepared by the oxidation of acrolein. Equally useful in the process of our invention are epoxyaldehydes which are prepared from olefinic aldehydes having one or more double bonds further removed from the formyl group. Typical examples of such aldehydes are vinyl acetaldehyde, 3-pentenal, 4-pentenal, methyl vinyl acetaldehyde, isopropenyl acetaldehyde, citronellal, and rhodinal.

Since, as will be seen, we prefer to conduct the process of our invention in aqueous solution, the preferred class of epoxyaldehydes are those which are readily soluble in aqueous systems. This preferred class comprises those epoxyalkyl aldehydes having less than 8 carbon atoms, e.g., 2,3-epoxybutanal, 2,3-epoxypentanal, 2,3-epoxyhexanal, 3,4-epoxyheptanal, 1,2-epoxyhexan-3-al, 2,3,4,5-diepoxypentanal, and the like. Epoxyalkanals having more carbon atoms, being considerably less soluble, are also operative in our process but require appreciably longer reaction times when used with the aqueous mode of operation.

These aliphatic epoxyaldehydes are reacted with a soluble metal hydride in a solvent with which the hydride does not react, to produce the epoxy alcohols. The soluble metal hydrides we employ fall into two classes: metal aluminum hydrides and metal borohydrides. The metal aluminum hydrides are those compounds having the formula $M(AlH_4)_n$ where M is an $n$-valent cation. Examples of such compounds include the alkali metal aluminum hydrides, such as $LiAlH_4$ and $NaAlH_4$, and the alkaline earth aluminum hydrides, typified by $Mg(AlH_4)_2$. Of these compounds, the more vigorous, inexpensive and available hydrides are the alkali metal aluminum hydrides and, of this class, we prefer $LiAlH_4$ as being the most reactive.

The metal aluminum hydrides react violently with water, and therefore cannot be used for reaction in aqueous media. On the other hand, they do not participate in undesired side reactions, and their yield of epoxy alcohols is therefore almost quantitative. Liquids in which the reactions with epoxyaldehydes may be carried out are ethers and ether-type solvents, such as the alkyl ethers, including diethyl ether and di-n-butyl ether, and such cyclic ether-like liquids as dioxane and tetrahydrofurane.

The other class of soluble metal hydride reactants we employ for preparing epoxy alcohols from aliphatic epoxyaldehydes is that class consisting of metal borohydrides. These borohydrides are complex metal hydrides having the general formula $M(BH_4)_n$ where M is an $n$-valent cation. Examples of such compounds include the metal borohydrides such as $Mg(BH_4)_2$, $Ca(BH_4)_2$, $Ti(BH_4)_3$ and $Zr(BH_4)_4$. Unlike $Al(BH_4)_3$, which is quite insoluble in water or organic solvents, the borohydride compounds we employ are those that are soluble in and unreactive with either or both water and many organic liquids. Of these, the most active, inexpensive and readily available borohydrides are the alkali metal compounds such as $LiBH_4$, $KBH_4$ and $NaBH_4$. These are therefore the preferred class of borohydrides.

The reaction of the epoxyaldehydes with borohydrides is conducted in a solvent in which both reactants are soluble. Since the borohydrides do not react with water, the solvent may be either organic, e.g., such liquids as the lower alcohols, including methanol, ethanol, and isopropanol, tetrahydrofurane, dioxane, or the dimethyl ether of diethylene glycol, or it may be aqueous. In general, one-quarter mole of borohydride is oxidized for every mole of aldehyde reduced. Because of the safety of working in water, we prefer to conduct the reaction in aqueous solution.

Both the epoxyaldehyde reactant and the epoxy alcohol product are unstable in either strongly acidic or strongly basic aqueous solution, and in strongly acidic aqueous media the borohydride reactant is rapidly hydrolyzed. Highest epoxide yields and most effective utilization of the borohydride reactant are obtained at pHs above 7.0 but less than about 10.0, that is, under conditions of relatively mild basicity. This is therefore the preferred range, since at pHs of about 10.0, side reactions of both reactant and product are likely to occur, diminishing the epoxy alcohol yield. For example, under strongly basic conditions, self-condensation of the starting epoxyaldehyde may take place, as well as opening of the epoxy ring in the aldehyde and epoxy alcohol. The most preferred pH range is that between about 7.5 and about 8.5, since within that range of hydrogen concentration yield and reaction rate are optimized.

Best yields of epoxy alcohols are obtained at temperatures between about 0° C. and about 25° C., while at higher temperatures the hydrolysis of the borohydride in aqueous solution appears to compete. Therefore, for the sake of economy and convenience, we prefer to conduct the reaction at about room temperature, without recourse to special heating or cooling.

The reaction may be conducted by batch, semicontinuous or continuous methods, using standard chemical equipment and techniques. Since the borohydrides are crystalline solids, it is convenient to dissolve them in water or other solvent, and add the resulting solution to the epoxyaldehyde or a solution thereof. In the preferred aqueous medium, the pH of the reaction may be readily controlled by judicious addition of acid and caustic, or by the use of appropriate phosphate, borate or other buffers.

At the termination of either the aqueous or organic phase of the process, the epoxy alcohol may be separated from the reaction mixture by such well-known methods as distillation or extraction. When distillation is employed, it is convenient to conduct it at reduced pressures to obviate the necessity of using high kettle temperatures. The difference in boiling points of the epoxyaldehyde reactant and the epoxy alcohol product is, in each case, generally sufficient to render distillation both simple and efficient.

The following examples will serve to illustrate the nature of our invention. It should be understood, however, that the examples are merely illustrative and are not to be regarded as limitations on the appended claims, since the basic teachings therein may be varied at will, as will be understood by a skilled organic chemist. In the examples, the ingredients are expressed in parts by weight unless otherwise indicated.

*Example I.—Aqueous Preparation of Glycidol*

One-tenth mole of potassium borohydride was dissolved in 25 parts of water. The resulting solution was added dropwise with stirring over a half-hour period to a solution of 0.40 mole of glycidaldehyde in 250 parts of ethanol. The pH of the solution was maintained at about 8.0 by dropwise addition of a 15% aqueous $H_2SO_4$ solution, and the temperature of the reaction mixture held below 25° C. by restricting the rate of addition of the borohydride solution, and by cooling in a water bath.

After the entire borohydride solution had been added, the reaction mixture was stirred for an additional half hour and kept cool with the water bath. The reaction mixture was then dried by addition of 100 parts of anhydrous magnesium sulfate, and filtered. An aliquot of the filtrate was taken, and a determination of its carbonyl and epoxide content made. Based on the resulting data, calculations showed a 90% yield of glycidol.

The solution was then evaporated to a residue under reduced pressure to remove the ethanol, the residue taken up in diethyl ether, refiltered, and the ether evaporated off. The residue was then Claisen-distilled to yield a sample coming over at 10 mm. pressure and a kettle and head temperature of about 50° C. whose characteristics were those of substantially pure glycidol. In this way, a 51% yield was obtained.

*Example II.—Preparation of Other Epoxy Alcohols*

Using the methods employed in the previous example, the following epoxy alcohols may be obtained in good yield:

| Epoxyaldehyde | Borohydride | Epoxy Alcohol |
| --- | --- | --- |
| 3,4-epoxyhexanal | $NaBH_4$ | 3,4-epoxyhexanol. |
| 2,3-epoxypentanal | $LiBH_4$ | 2,3-epoxypentanol. |
| 2-methyl-3,4-epoxybutanal | $Ca(BH_4)_2$ | 2-methyl-3,4-epoxybutanol. |
| 2,3,4,5-diepoxyhexanal | $KBH_4$ | 2,3,4,5-diepoxyhexanol. |

*Example III.—Organic Phase Preparation of Glycidol*

To 300 parts of anhydrous diethyl ether was added 3.8 parts of $LiAlH_4$, and the resulting solution was added, with stirring over a period of about 2 hours to 28.8 parts of anhydrous glycidaldehyde. The reaction mixture was stirred for about 3 more hours, being maintained at room temperature. At the end of that time, 4 parts of water were added and the solution stirred for 20 minutes more, to hydrolyze residual hydride. The precipitate, consisting of metal hydroxides and some organic materials, was then filtered from the mixture, and the ether stripped from the filtrate under reduced pressure at room temperature. The bottoms amounted to 16.5 parts of a clear liquid which, upon analysis by gas-liquid partition chromatography, showed an 80% yield of glycidol.

We claim as our invention:

1. The process for the preparation of vic-epoxy alkanol, comprising reacting a vic-epoxyalkanal of less than 8 carbon atoms, with a soluble metal hydride selected from the group consisting of hydrides of the formula $M(AlH_4)_n$ and $M(BH_4)_n$, where M is an $n$-valent cation, in an inert solvent, said solvent when aqueous having a pH between about 7 and 10, at a temperature between about 0° C. and about 25° C.

2. The process for the production of vic-epoxy alkanol, comprising reacting a vic-epoxyalkanal of less than 8 carbon atoms with alkali metal borohydride in aqueous solution of pH between about 7 and 10, at a temperature between about 0° C. and about 25° C.

3. The process of claim 2, wherein the vic-epoxyalkanal is glycidaldehyde.

4. The process for the preparation of vic-epoxy alkanol, comprising reacting a vic-epoxyalkanal of less than 8 carbon atoms with an alkali metal aluminum hydride, in ether solution, at a temperature between about 0° C. and about 25° C.

5. The process of claim 4, wherein the vic-epoxyalkanal is glycidaldehyde.

References Cited in the file of this patent

UNITED STATES PATENTS

| | | |
|---|---|---|
| 2,683,721 | Schlesinger | July 13, 1954 |
| 2,874,165 | Brown | Feb. 17, 1959 |

OTHER REFERENCES

Nystrom et al.: J. Am. Chem. Soc., vol. 69, May 1947, pages 1197–1199.

Krajkeman: Mfg. Chemist, vol. XXII, April 1951, pages 147–152; 156.